United States Patent [19]

Koga et al.

[11] 4,320,511
[45] Mar. 16, 1982

[54] METHOD AND DEVICE FOR CONVERSION BETWEEN A CYCLIC AND A GENERAL CODE SEQUENCE BY THE USE OF DUMMY ZERO BIT SERIES

[75] Inventors: Keiichiro Koga, Urawa; Yutaka Yasuda, Tanashi; Ryokichi Saga, Tokyo; Yukio Takimoto, Tokyo, all of Japan

[73] Assignees: Kokusai Denshin Denwa Co., Ltd.; Nippon Electric Co., Ltd., both of Tokyo, Japan

[21] Appl. No.: 129,486

[22] Filed: Mar. 11, 1980

[30] Foreign Application Priority Data

Mar. 13, 1979 [JP] Japan .................................. 54-28217
Mar. 13, 1979 [JP] Japan .................................. 54-28218
Mar. 13, 1979 [JP] Japan ............................ 54-31216[U]

[51] Int. Cl.³ ............................................. G06F 11/10
[52] U.S. Cl. ..................................................... 371/37
[58] Field of Search ............................. 371/37, 39, 40

[56] References Cited

U.S. PATENT DOCUMENTS 3,418,630 12/1968 Van Duuren ........................ 371/39
3,622,984 11/1971 Eastman ............................... 371/40

FOREIGN PATENT DOCUMENTS

2018095 10/1979 United Kingdom .................. 371/40

Primary Examiner—Charles E. Atkinson
Attorney, Agent, or Firm—Laff, Whitesel, Conte & Saret

[57] ABSTRACT

The invention converts between a cyclic and a general code sequence, each sequence having a succession of normal code blocks and an additional or shorter code block. A zero bit series is hypothetically assumed before the additional code block. In an encoder for producing a cyclic code sequence, the zero bit series is placed before the additional code block by cooperation of a timing control circuit and a divider. In a decoder, a counter times an additional cyclic code block and starts counting while another counter is still counting to time a period, which is the period next preceding a normal cyclic code block, whereby the zero bit series is assumed.

5 Claims, 11 Drawing Figures

METHOD AND DEVICE FOR CONVERSION BETWEEN A CYCLIC AND A GENERAL CODE SEQUENCE BY THE USE OF DUMMY ZERO BIT SERIES

BACKGROUND OF THE INVENTION

This invention relates to a method of carrying out conversion between a cyclic code sequence and a general code sequence. This invention relates also to an encoder and a decoder for carrying out the conversion.

In satellite communication of the known TDMA (time division multiple access) type, a cyclic code sequence is transmitted and received to improve the performance. It is therefore necessary to carry out conversion between a cyclic and a general code sequence, each consisting of a plurality of code blocks. More particularly, the general code sequence is encoded in a transmitter into the cyclic code by supplementing data bits of each code block of the general code sequence with a predetermined number of check bits that forms a cyclic code together with the data bits contained in that code block. The cyclic code sequence is decoded into the general code sequence in a receiver by removing the check bits of each code block.

Each cyclic or general code sequence as called herein has a variable duration determined by a burst that is known in the art. On the other hand, each code block is normally given a normal code block period. It is therefore necessary that each code sequence should comprise an additional code block of a variable additional code block period in addition to such normal code blocks. It is the practice to make the additional code block period shorter than the normal code block period.

A method of carrying out such a conversion is proposed in a Japanese technical paper, Densi Tûsin Gakkai Tûsin-hôsiki Kenkyûkai Siryô CS 77-66 (Papers for Communication System Study Committee of the Institute of Electronics and Communication System Engineers of Japan, No. 77-66), contributed by Keiichiro KOGA, Yutaka YASUDA, Takuro MURATANI, Yoshihiro IWADARE, and Katsuhiro NAKAMURA, under the title of "TDMA Hôsiki ni taisuru Ayamari Teisei Hugô no Tekiyô (Application of FEC Coding to TDMA Systems)" and published in September, 1977. According to this paper, conversion between an additional code block of one of the cyclic and the general code sequences and a corresponding additional code block of the other of the sequences is carried out by preparing a dummy bit series for the data bits of the additional code block of the sequence that should be converted to the other sequence. However, the technical paper does not disclose how to discriminate the additional code block from the normal code blocks.

SUMMARY OF THE INVENTION

It is an object of this invention to provide a method of carrying out a conversion between a cyclic and a general code sequence, which is capable of discriminating between normal code blocks and an additional code block.

It is another object of this invention to provide an encoder for carrying out the method mentioned above, which is simple in structure and is economical.

It is a further object of this invention to provide a decoder for carrying out the above-mentioned method, which is capable of readily decoding an additional code block even when the additional code block is variable in duration.

A method to which this invention is applicable is for carrying out a conversion between a cyclic code sequence and a general code sequence. The cyclic code sequence lasts a duration determined by a burst. Each of the cyclic and the general code sequences consists of a plurality of normal code blocks and an additional code block arranged in a predetermined order. Each of the normal code blocks of the cyclic code sequence consists of a normal cyclic code of a first predetermined number of data bits followed by a second predetermined number of check bits. The additional block of the cyclic code sequence consists of an additional cyclic code of a variable number of data bits followed by check bits. The variable number is less than the first predetermined number and dependent on the burst. The check bits of the additional cyclic code are equal in number to the second predetermined number. Each of the normal code blocks of the general code sequence is for data bits followed by a prescribed period. The additional code block of the general code sequences is also for data bits followed by a like prescribed period. The data bits in the normal and the additional code blocks of the general code sequence is equal in number to the first predetermined and the variable numbers, respectively. The prescribed period is for arranging a plurality of check bits, equal in number to the second predetermined number, but containing none of the last-mentioned check bits.

According to this invention, the method comprises the steps of establishing normal code block periods of the normal code blocks of a predetermined one of the cyclic and the general code sequences and an additional code block period of the additional code block of the predetermined code sequence, converting the normal code blocks of the predetermined code sequence to the normal code blocks of the other of the cyclic and the general code sequences, respectively, when the normal code block periods are measured, and converting the additional code block of the one code sequence to the additional code block of the other code sequence when the additional code block period is measured, the additional code block converting step being carried out by assuming that the data bits in the additional code block of the predetermined code sequence is preceded by a dummy zero bit series of a data length equal to a difference between the first predetermined number and the variable number.

DESCRIPTION OF THE PREFERRED EMBODIMENTS

Figure 1:
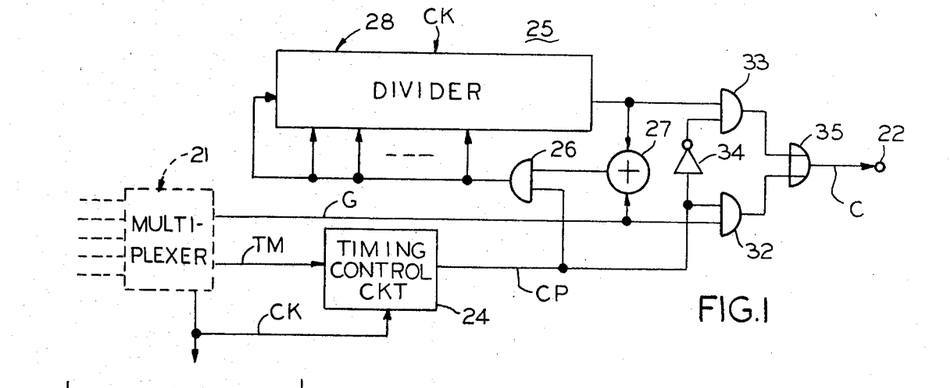
FIG. 1 is a block diagram of a converter according to a first embodiment of this invention, the converter being for use as an encoder.
Figure 2:
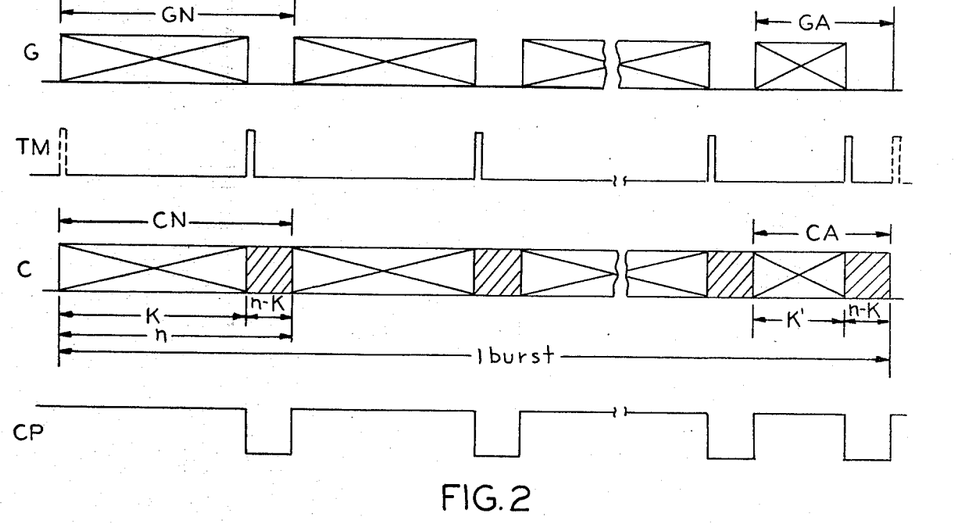
FIG. 2 is a time chart for describing operation of the converter illustrated in FIG. 1.

Referring to FIGS. 1 and 2, a converter according to a first embodiment of this invention is for use as an encoder in combination with a multiplexer 21 (shown by a broken line) responsive to a plurality of code sequences for supplying the encoder with a general code sequence G. The encoder is for encoding the general code sequence G to a cyclic code sequence C so as to supply an output terminal 22 with the cyclic code sequence C. The cyclic code sequence C is phase matched to and synchronized with the general code sequence G. Each of the general and the cyclic code sequences G and C consists of a plurality of normal code blocks and an additional code block. The additional code block may be arranged after a succession of the normal code blocks and immediately follows a preceding normal code block among the normal code blocks of the succession. The normal and the additional code blocks of the general code sequence G are designated by GN and GA, respectively, while the normal and the additional code blocks of the cyclic code sequence C, by CN and CA, respectively.

The cyclic code sequence C is arranged in a single burst which may be variable in duration. Each of the normal code blocks CN consists of a normal cyclic code of a bit number n which may be, for example, 127. The normal cyclic code consists of a first predetermined number k of data bits and a second predetermined number n−k of check bits following the data bits. The first and the second predetermined numbers k and n−k may be 112 and 15, respectively. The additional code block CA is an additional cyclic code consisting of data bits of a variable number k' and check bits, equal in number to n−k. The variable number k' is less than the first predetermined number k.

Each of the normal code blocks GN of the general code sequence GN comprises data bits, k in number, followed by a prescribed period. The additional code block GA comprises data bits, k' in number, followed by a like prescribed period. The prescribed period is for arranging a plurality of check bits, equal in number to the predetermined number. Neither data bits nor check bits are arranged in any of the prescribed periods.

The encoder is supplied with a series of timing pulses TM and a sequence of clock pulses CK from the multiplexer 21. Each of the timing pulses TM is synchronized with a last data bit of each of the normal and the additional code blocks GN and GA. The clock pulses CK are synchronized with the respective data bits and are produced even during the prescribed periods of the normal and the additional code blocks GN and GA. The last data bit is readily detected in the multiplexer 21 in a usual manner. The timing pulse series TM is supplied to a timing control circuit 24 to establish normal code block periods of the normal code blocks CN and an additional code block period of the additional code block CA. More specifically, the timing control circuit 24 is a counter responsive to each of the timing pulses TM for counting the clock pulses CK to a predetermined count equal to the second predetermined number n−k to produce a sequence of control pulses CP. Each of the control pulses CP defines the prescribed period and thereby defines also a data bit period of any one of the normal and the additional code blocks GN and GA. Each of the control pulses CP takes a high level "H" (FIG. 2) during the data bit period and a low level "L" during the prescribed period. The high and the low levels "H" and "L" will be referred to as a logic "1" and a logic "0" level hereinafter, respectively.

The general code sequence G is supplied to a check bit generator section 25 as an input code sequence together with the control pulse sequence CP. The check bit generator section 25 comprises a first AND gate 26, an Exclusive OR circuit 27, and a divider 28 for carrying out a predetermined division. As is well-known in the art, the divider 28 is a combination of a shift register and a plurality of adders (mod. 2), which combination is connected in accordance with a predetermined degree of a generator polynomial determined as a divisor of the predetermined division. Herein, it suffices to say that the predetermined degree is given by the second predetermined number n−k and that the shift register of the divider 28 has a plurality of stages, equal in number to the predetermined degree of the generator polynomial, and is successively shifted by the clock pulses CK.

During each of the data bit periods of the normal code blocks GN, the first AND gate 26 is enabled by the control pulse sequence CP. As a result, the data bits of each normal code blocks GN are supplied for use as a dividend of the predetermined division through the Exclusive OR circuit 27 to the divider 28. More particularly, the divider 28 starts carrying out the division from an initial state when a first one of the data bits of each normal code blocks GN is supplied to the divider 28. It is assumed that all stages of the shift register of the divider 28 take the logic "0" level in the initial state. The divider 28 continually carries out the division during the data bit period of each normal code blocks GN to produce a series of intermediate residue pulses specifying an intermediate residue of the division. The intermediate residue pulse series is successively fed back to the Exclusive OR circuit 27 during each data bit period of each normal code block GN. The Exclusive OR circuit 27 acts as a part of the divider 28 in a usual manner to carry out the division. When the data bit period of each normal code block lapses into the prescribed period following that data bit period, the first AND gate 26 disabled by the clock pulse CK. The divider 28 stops the division with a final residue of the division kept in the respective stages of the shift register. The final residue is successively produced as a first set of check bits in synchronism with the clock pulses CK during the prescribed period.

When the data bits of the additional code block GA are supplied to the divider 28, the division is also started from the initial state, as is the case with the normal code blocks. The divider 28 is kept in the initial state unless the data bits are supplied thereto. As described before, the variable number k' of the additional code block GA is less than the first predetermined number k of each normal code block. From these facts, it is possible to assume that the data bits of the additional code block GA is preceded by a zero bit series of a data length equal to a difference between the first predetermined number k and the variable number k'. Therefore, the divider 28 is capable of also producing a second set of check bits next following the data bits of the additional code block GA.

The encoder further comprises second and third AND gates 32 and 33, an inverter 34, and an OR gate 35 to combine the general code sequence G and the first and the second sets of check bits into the cyclic code sequence C. More particularly, the second AND gate 32 is enabled by the control pulse CP during each data bit period. The data bits of each of the normal and the additional code blocks GN and GA are, therefore, supplied through the second AND gate 32 and the OR gate 35 to the output terminal 22. On the other hand, the third AND gate 33, which is supplied with the intermediate residue pulse series during each data bit period, is disabled by the control pulse CP supplied through the inverter 34. As a result, the intermediate residue pulse series is intercepted by the third AND gate 33.

While the control pulse CP takes the logic "0" level, the third AND gate 33 is enabled with the second AND gate 32 disabled. The first and the second sets of check bits are supplied through the third AND gate 33 and the OR gate 35 to the output terminal 22 during the prescribed periods of the respective normal code blocks GN and the additional code block GA, respectively. As a result, the first set of check bits is combined with the data bits of each normal code block. It has been proved that such a combination forms a cyclic code, as described in "Error-Correcting Codes," page 206, authored by W. W. Peterson and published 1972 by The MIT Press, Massachusetts. Likewise, the second set of the check bits is arranged just after the data bit set of additional code block GA. It is readily understood that such an arrangement also forms a cyclic code under the above-mentioned assumption.

Instead of a series of the timing pulses TM synchronized with the last bits of the respective code blocks GN and GA, it is possible to use a pair of timing pulses which are phase matched to a beginning and an end of the burst. The timing pulse pair is shown by dashed lines in FIG. 2. In this case, the timing control circuit 24 is a combination of a first and a second counter for counting the clock pulses CK to counts k and n−k, respectively.

Figure 3:
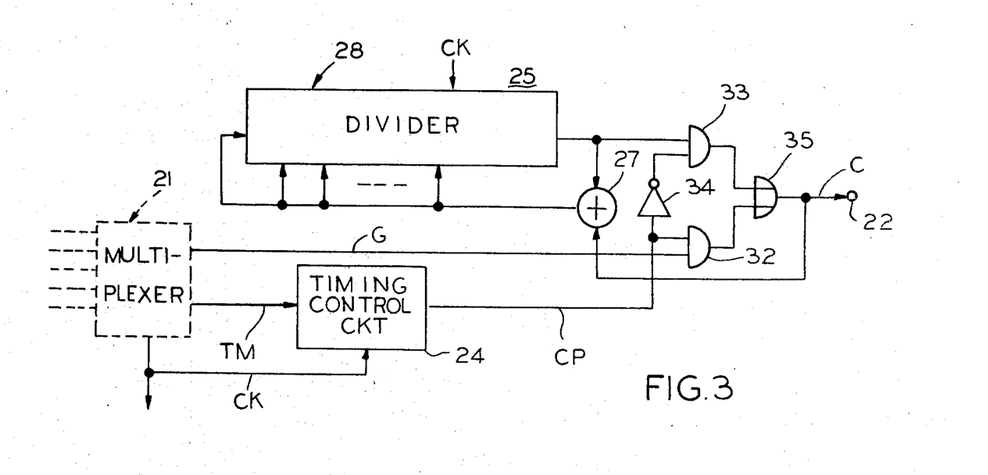
FIG. 3 is a block diagram of a converter according to a modification of the first embodiment of this invention.

Referring to FIG. 3, an encoder according to a modification of the first embodiment of this invention comprises similar parts designated by like reference numerals except that the first AND gate 26 is removed and that the cyclic code sequence C is supplied as the input code sequence to the Exclusive OR circuit 27, instead of the general code sequence G. For convenience of further description, it may be mentioned here that the input code sequence comprises a plurality of data bit sets of a first kind and a data bit set of a second kind and that the data bits of the first-kind sets and the second-kind set correspond to the data bits in the normal and the additional code blocks of either of the cyclic and the general code sequences, respectively.

During each of the data bit periods of the general code sequence G, the data bits in each of the normal and the additional code blocks GN and GA are supplied through the second AND gate 32 and the OR gate 35 to the output terminal 22 and are fed back to the Exclusive OR circuit 27 as the first-kind sets and the second-kind set, respectively. This operation is equivalent to that of FIG. 1. During each prescribed period, the Exclusive OR circuit 27 is supplied with each of the check bits directly and through the third AND gate 33 and the OR gate 35. In other words, the same input signals are given the Exclusive OR circuit 27. Therefore, the Exclusive OR circuit 27 continuously gives the divider 28 logic "0" level during the prescribed period. The encoder illustrated in FIG. 3 is thus equivalent to that of FIG. 1.

Figure 4:
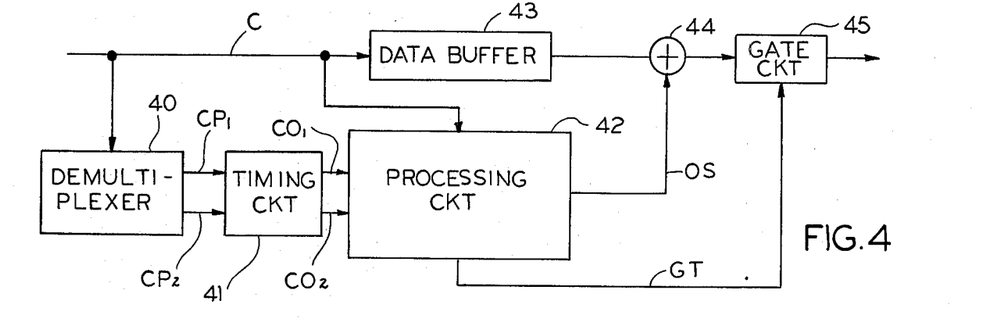
FIG. 4 is a block diagram of a converter according to a second embodiment of this invention, the converter being for use as a decoder.

Referring to FIG. 4, a converter according to a second embodiment of this invention is for use as a decoder in combination with a demultiplexer 40 supplied with a cyclic code sequence C which is produced either by an encoder illustrated hereinabove or by a conventional encoder. The demultiplexer 40 is capable of detecting the beginning and the end of each burst to produce a duration signal comprising first and second pulses $CP_1$ and $CP_2$. The first and the second pulses $CP_1$ and $CP_2$ are timed relative to the beginning and the end of each burst, respectively, to specify the duration of the cyclic code sequence C. The normal and the additional cyclic code blocks CN and CA will be simply named the normal and the additional code blocks, respectively, unless the simple naming is confusing.

Figure 5:
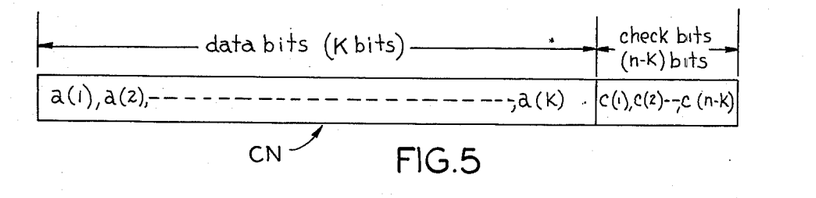
FIG. 5 shows a format of a normal code block of a cyclic code sequence supplied to the converter illustrated in FIG. 4.
Figure 6:
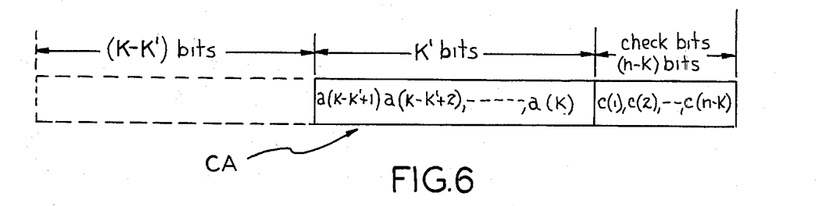
FIG. 6 shows a format of an additional code block of a cyclic code sequence supplied to the converter illustrated in FIG. 4.

Turning to FIGS. 5 and 6 for a short while, the additional code block CA will be compared with any one of the normal code blocks CN. In FIG. 5, the n-bit normal cyclic code consists of first through k-th data bits a(1) to a(k) and first through (n−k)-th check bits c(1) to c(n−k) arranged in succession in synchronism with the clock pulses CK. The data and the check bits are first through n-th bits of the cyclic code. In other words, the first data bit a(1), the first through the (n−k−1)-th check bits c(1) to c(n−k−1), and the (n−k)-th check bit c(n−k) are a leading bit, (k+1)-th through (n−1)-th bits, and an n-th or last bit of the cyclic code.

In FIG. 6, the additional code block CA consists of an additional cyclic code. With an encoder illustrated with reference to FIG. 1 or 3, the data bits of a general code sequence G are encoded into the additional cyclic code by assuming that a dummy zero bit series of a data length equal to the difference between the first and the second predetermined numbers (k−k') precedes the data bits under consideration. It is therefore possible on describing a decoder according to this invention to deem the additional cyclic code to be equivalent to a normal cyclic code from which the first through the (k−k')-th data bits a(1) to a(k−k') are omitted. Data bits of the additional code sequence are now numbered from (k−k'+1) to k. For convenience of further description, let that one of the normal code blocks CN which immediately precedes additional code block CA be called a preceding code block.

Figure 7:
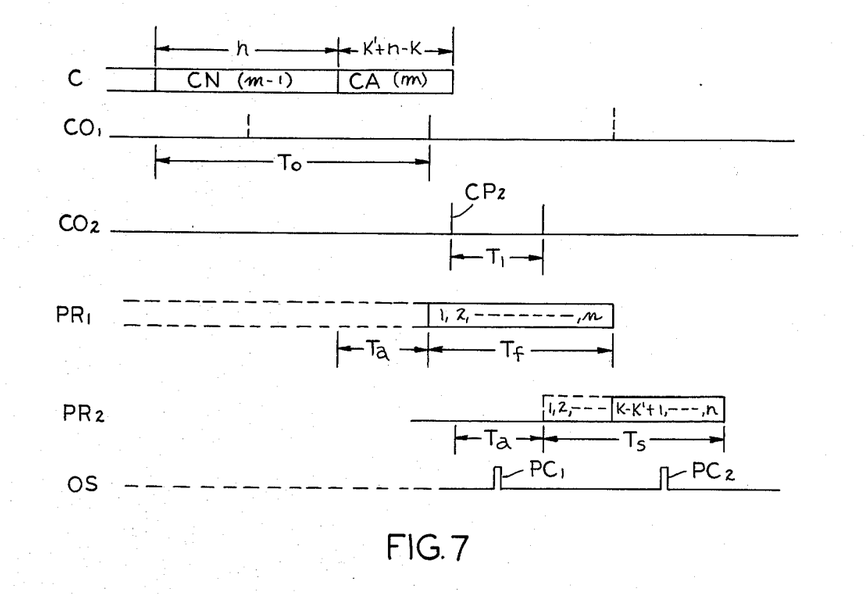
FIG. 7 is a time chart for describing the operation of a converter according to the second embodiment.

Referring back to FIG. 4 and referring also to FIG. 7, let the cyclic code sequence C be a sequence of m code blocks, where m represents an integer greater than two. The preceding and the additional code blocks are an (m−1)-th and an m-th code block.

The decoder comprises a timing circuit 41 responsive to the first and the second pulses $CP_1$ and $CP_2$ for timing the normal and the additional code block periods to produce a sequence of first control pulses $CO_1$ and a second control pulse $CO_2$. The first control pulses $CO_1$ are timed relative to the respective normal code block periods of the cyclic code sequence C. As depicted in FIG. 7 for the (m−1)-th code block with a solid line, the first control pulse $CO_1$ appears at an instant a prescribed interval of time $T_0$ after the leading bit of the related code block. This applies to the remaining normal and the additional code blocks. The first control pulses $CO_1$ for such code blocks are illustrated by dashed lines. The second control pulse $CO_2$ appears at an instant a first predetermined duration $T_1$ after the second pulse $CP_2$. It is possible to measure the "prescribed interval" from the n-th or the last bit of each code block in harmony with the definition of the first predetermined duration $T_1$.

The decoder comprises a processing circuit 42, which will later be described in detail. The processing circuit 42 monitors the data and the check bits of each of the m code blocks of the cyclic code sequence C. If an error is found in one of the code blocks, the processing circuit 42 generates an error correcting pattern a certain interval of time after the n-th or last bit of that code block. It is possible to select a common access time $T_a$ for generation of such error correcting patterns.

The prescribed interval $T_0$ and the first predetermined duration $T_1$ are selected in consideration of the access time $T_a$. For example, the prescribed interval $T_0$ is equal in duration to a sum of the normal block period and the access time $T_a$. The first predetermined interval $T_1$ may be equal to the access time $T_a$.

The processing circuit 42 comprises a first counter (not shown in FIG. 4). Energized the prescribed interval $T_0$ after each first control pulse $CO_1$, the counter begins to count clock pulses synchronized with the data and the check bits of the cyclic code sequence C. The count varies from 1 to n as illustrated in FIG. 7 at $PR_1$. A second counter is energized by the second control pulse $CO_2$. The count varies as indicated at $PR_2$.

By the use of the counts $PR_1$ and $PR_2$, the processing circuit 42 produces an error indicating signal OS. Let an error be found at a certain bit in each of the (m−1)-th and the m-th code block. As the error correcting pattern for the (m−1)-th code block, the processing circuit 42 produces a first processed signal $PC_1$ at an instant at which the count $PR_1$ indicates the bit where the error is found. Similarly, a second processed signal $PC_2$ is produced for the m-th code block. The error indicating signal OS is given by such processed signals.

More particularly, the (m−1)-th code block is processed during a first processing period $T_f$ that follows the first control pulse $CO_1$ for the (m−1)-th code block. The m-th code block is processed during a second processing period $T_s$ that follows the second control pulse $CO_2$ and is equal in duration to the first processing period $T_f$. The second processing period $T_s$ consists of a first partial period, as shown by a dotted line, and a second partial period continuously following the first partial period, as shown by a solid line. The first partial period is for processing the zero bit series as illustrated with reference to FIG. 2. The second partial period is for processing the m-th code block and follows the first processing period $T_f$ for the (m−1)-th code block.

The first processed signal $PC_1$ appears the first processing period while the second processed signal $PC_2$ appears the second partial period. This means that the m-th or additional cyclic code block is processed by assuming that the additional cyclic code block is preceded by the dummy zero bit series.

In addition, the processing circuit 42 produces a gating pulse GT for removing the check bits from each code block after detecting either of the normal and the additional code blocks CN and CA.

The decoder comprises a data buffer 43 for successively memorizing one code block of the cyclic code sequence at a time as a memorized code block to sequentially produce the memorized code blocks. Each of the memorized code blocks is supplied to an Exclusive OR circuit 44 in synchronism with the timing of the error indicating signal OS. The Exclusive OR circuit 44 combines the memorized normal and the memorized additional code blocks with the first and the second processed signals, respectively, to produce a combined cyclic code sequence. At the Exclusive OR circuit 44, an error bit of each of the memorized code blocks is inverted into a correct bit by each of the first and the second processed signals $PC_1$ and $PC_2$. Therefore, the combined cyclic code sequence is produced as an error-free cyclic code sequence. A gate circuit 45 removes check bits from the error-free cyclic code sequence in response to the gating pulse GT supplied from the processing circuit 42 to produce the general code sequence G. In other words, the gate circuit 45 serves to convert the error-free cyclic code sequence into the general code sequence G. The gating pulse GT may be supplied from any other devices except the processing circuit 42.

Figure 8:
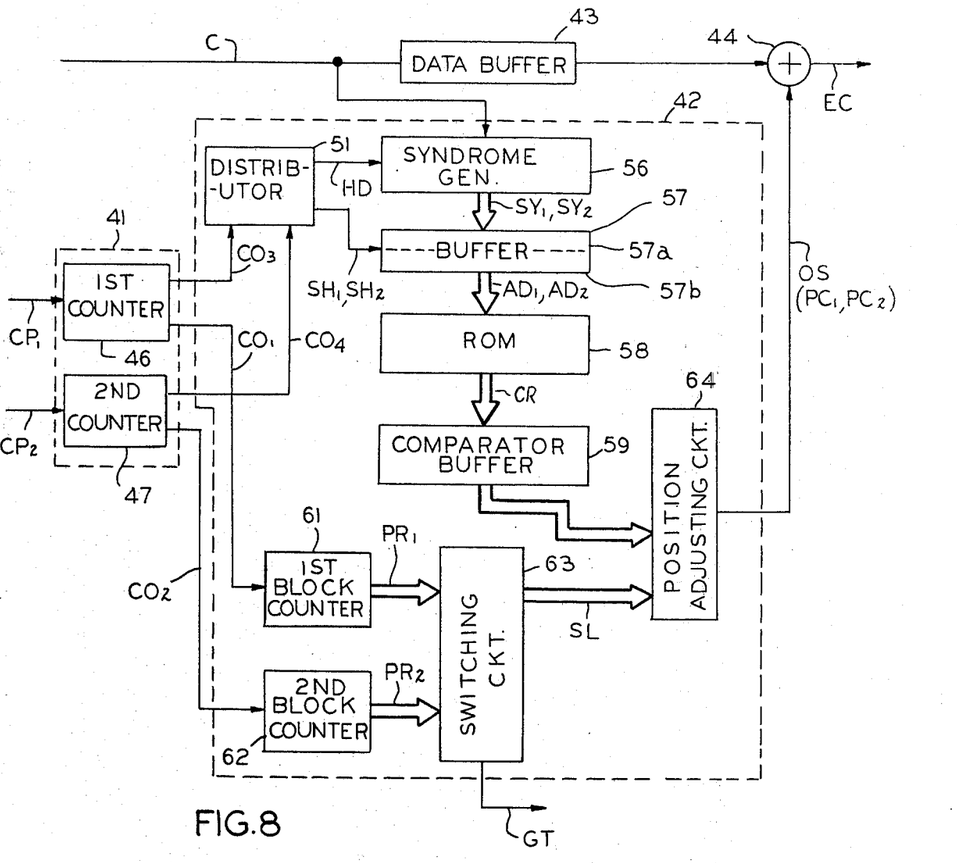
FIG. 8 shows a block diagram of a converter according to a third embodiment of this invention, the converter being for use as a decoder.

Referring to FIG. 8, a converter according to a third embodiment of this invention is for use as a decoder in combination with the demultiplexer (not shown in this figure) and comprises similar parts designated by like reference numerals. The timing circuit 41 comprises first and second counters 46 and 47 responsive to the first and the second pulses $CP_1$ and $CP_2$ for producing the first and the second control pulses $CO_1$ and $CO_2$, respectively. Responsive to the first pulse $CP_1$, the first counter 46 produces also a sequence of third control pulses $CO_3$, each of which is timed relative to the beginning of each of the normal and the additional code block periods in the cyclic code sequence. Supplied with the second pulse $CP_2$, the second counter 47 produces a fourth control pulse $CO_4$ timed relative to the second pulse $CO_2$. By way of example, the third and the fourth control pulses $CO_3$ and $CO_4$ are advanced in phase relative to the first and the second pulses $CO_1$ and $CO_2$ by the preselected interval $T_0$ and the first predetermined period $T_1$, respectively. Both of the third and the fourth control pulses $CO_3$ and $CO_4$ are sent to the processing circuit 42.

The processing circuit 42 comprises a distributor 51. In this connection, it may be pointed out here that the variable duration of the additional code block CA may be shorter than the access time $T_a$. Operation of the processing circuit 42 becomes a little different according as the variable duration is shorter and not shorter than the access time $T_a$.

Figure 9:
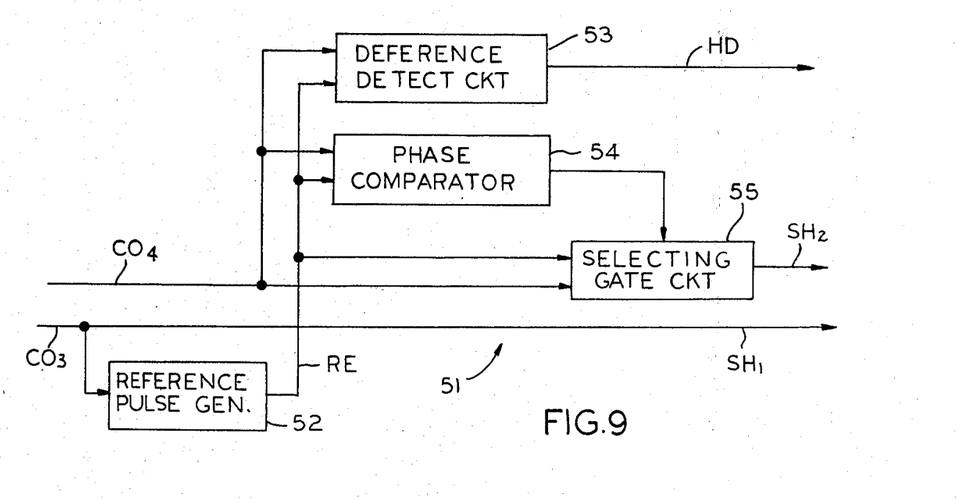
FIG. 9 is a block diagram of a distributor of the converter depicted in FIG. 8.

Turning temporarily to FIG. 9, the distributor 51 comprises a reference pulse generator 52 responsive to each of the third control pulses $CO_3$ for producing a reference pulse RE at an instant delayed by a preselected period relative to each third control pulse $CO_3$. The preselected period is equal to the first predetermined period $T_1$ or the access time $T_a$. It is possible to use the first control pulses $CO_1$ as the reference pulses RE, without using the reference pulse generator 52. The reference pulses RE and the fourth control pulses $CO_4$ are sent to a difference detecting circuit 53. The difference detecting circuit 53 is energized by the fourth control pulse $CO_4$ and produces a holding signal HD that lasts a duration between the fourth control pulse $CO_4$ and the next following reference pulse RE. Briefly, the holding signal HD is produced only when the m-th code block is shorter than the access time $T_a$. Use of the holding signal HD will be described later. The difference detecting circuit 53 may be a combination of a flip-flop and a gate circuit.

A phase comparator 54 compares the fourth control pulse $CO_4$ with the reference pulses RE to produce a first level signal until the fourth control pulse $CO_4$ and a second level signal following the fourth control pulse $CO_4$ and lasting until the next following reference pulse appears. The distributor 51 produces the third control pulses $CO_3$ as a sequence of first shift pulses $SH_1$, as long as the third control pulse sequence $CO_3$ lasts. On the other hand, the fourth and the reference pulses $CO_4$ and RE are supplied to a selecting gate circuit 55 together with either of the first and the second level signals. The selecting gate circuit 55 selects the fourth control pulse $CO_4$ when the first level signal appears and, otherwise, the reference pulse RE to produce a second shift pulse $SH_2$. The selected fourth control pulse $CO_4$ is representative of the fact that the m-th or additional code block is not shorter than the access time $T_a$. The selected reference pulse RE is representative of the fact that the m-th code block is shorter than the access time $T_a$.

The processing circuit 42 comprises a syndrome generator 56 supplied with the cyclic code sequence C, a buffer 57 connected to the syndrome generator 56, and a read-only memory 58 connected to the buffer 57. The bit pattern of each normal code block CN will now be called a first block bit pattern. The bit pattern of the additional code block CA will be called a second block bit pattern. The first block bit pattern varies in compliance with a combination of the data bits, k in number, and the check bits, (n−k) in number. The second block bit pattern is dependent on a combination of the data bits, k' in number, and the check bits, again (n−k) in number.

Figure 10:
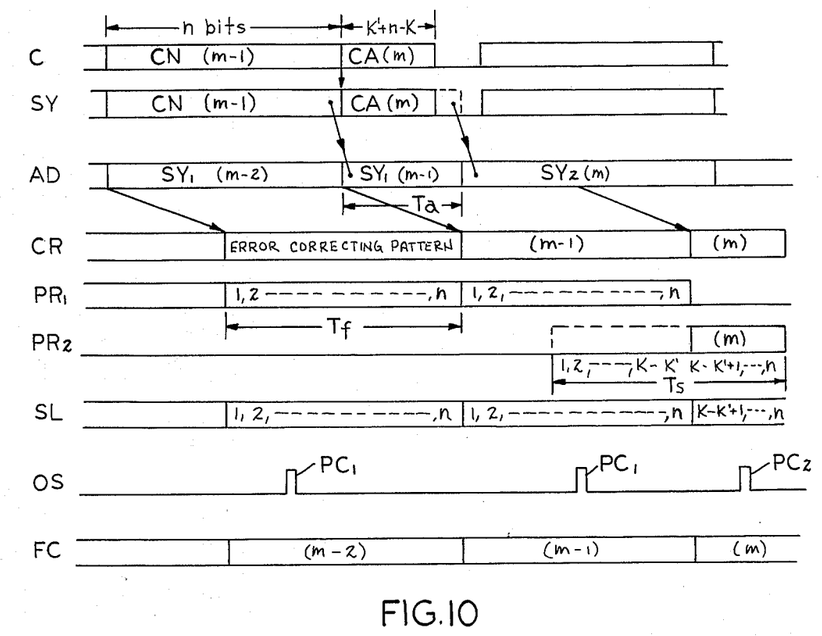
FIG. 10 is a time chart for describing operation of the converter illustrated in FIG. 9.

Referring now to FIG. 10 in addition to FIG. 8, the syndrome generator 56 is responsive to one of the normal and the additional code blocks CN and CA at a time and generates syndromes $SY_1$ of a first-kind and a second-kind syndrome $SY_2$ for the normal and the additional code blocks CN and CA, respectively. The first-kind syndromes $SY_1$ thus correspond to the respective normal code blocks CN. Each syndrome $SY_1$ or $SY_2$ has a prescribed number of bits, such as fifteen bits, and held in the syndrome generator 56 during presence of the holding signal HD, as shown by a dashed line at SY, and then moved to the buffer 57. Each of the first-kind syndromes $SY_1$ has a first syndrome bit pattern peculiar to the first block bit pattern of the corresponding normal code block. The second-kind syndrome $SY_2$ has a second syndrome bit pattern peculiar to a combination of the zero bit series and the second block bit pattern.

The first-kind syndromes $SY_1$ except that corresponding to the (m−1)-th code block are successively supplied from the buffer 57 to the read-only memory 58 in response to the first shift pulses $SH_1$. The first-kind syndrome $SY_1$ for the (m−1)-th code block is transferred to the read-only memory 58 in response to the second shift pulse $SH_2$. The first-kind syndromes $SY_1$ serve as first-kind address signals $AD_1$ for the read-only memory 58. Likewise the second-kind syndrome $SY_2$ serves as a second-kind address signal $AD_2$. The syndrome generator 56 and the buffer 57 thus serve as a syndrome section responsive to the cyclic code sequence C, the holding signal HD, and the first and second shift pulses $SH_1$ and $SH_2$ for producing the first-kind and the second-kind syndromes $SY_1$ and $SY_2$ for the normal and the additional code blocks CN and CA, respectively.

The first-kind and the second-kind syndromes $SY_1$ and $SY_2$ are given the ROM 58 as the first-kind and the second-kind address signals $AD_1$ and $AD_2$ for specifying addresses of the ROM. The ROM 58 stores an error correcting pattern CR corresponding to each of the first-kind and the second-kind syndromes to produce the error correcting pattern CR at the end of the access time after each syndrome is supplied from the buffer section 57. The error correcting pattern CR is for correcting each code block and consists of correcting pattern bits of a preselected number n equal to the sum of the first and the second predetermined numbers. Each of the pattern bits is placed with each bit position numbered in order.

The error correcting pattern OR is supplied at a time to a comparator buffer 59 for retaining the error correcting pattern CR with the bit positions numbered in order. From FIG. 10, it is readily understood that the error correcting pattern CR is supplied from the ROM 58 to the comparator buffer 59 at the end of the access time $T_a$ after each syndrome is retained at the buffer section 57.

The processing circuit 42 comprises a first block counter 61 energized by the first control pulse $CO_1$ for counting the clock pulses. The count of the first block counter 61 varies from 1 to n, as shown in FIG. 10 at $PR_1$, and is produced as a sequence of first addresses each of which specifies each bit positions of the error correcting pattern retained in the comparator buffer 59. The counts $PR_1$ appear each of the first processing periods $T_f$. Energized by the second control pulse $CO_2$, a second block counter 62 also counts the clock pulses from 1 to n, as shown in FIG. 10 at $PR_2$. The counts $PR_2$ of the second block counter 62 appear the second processing period $T_s$ and are produced as a sequence of second addresses, each of which also specifies each bit positions of the error correcting pattern CR retained in the comparator buffer 59. As shown in FIG. 10, the second block counter 62 is put into operation between the first and the (k−k')-th addresses simultaneously with the first block counter.

The first and the second addresses are sent to a switching circuit 63. The switching circuit 63 selects the first addresses during the first processing period $T_f$ and the second addresses only during the second partial period following the first partial period to produce a sequence of selected addresses, as shown in FIG. 10 at SL. The switching circuit also produces the gating pulse GT for removing the check bits of each code block by the supervising each of the first and the second addresses in the usual manner.

The selected address sequence SL is supplied to a position adjusting circuit 64 together with the retained error correcting pattern. The position adjusting circuit 64 adjusts each bit position of the error correcting pattern CR to each of the selected address SL to produce the first and the second processed signals $PC_1$ and $PC_2$ as the output sequence OS. Thus, the bit positions of the error correcting pattern CR are produced in accordance with the selected address sequence SL. More particularly, the error correcting pattern for the additional code block is successively produced from the (k−k'+1)-th address to the n-th address, as shown in FIG. 10. This means that the additional code block is processed by assuming that the additional code block is preceded by the dummy zero bit series between the first and the (k−k')-th addresses. The position adjusting circuit 64 may be a comparator.

Like in FIG. 4, the output sequence OS is supplied to the Exclusive OR circuit 44 to correct the error in the cyclic code sequence C supplied through the data buffer 43 and to produce the error-free cyclic code sequence EC.

A single burst has so far been described in the second and third embodiments. However, the single burst is usually followed by a succeeding burst with a spacing left therebetween. It is preferable that the spacing is as short as possible. With the third embodiments having the single buffer 57, the minimum spacing should be equal in duration to a difference between the access time $T_a$ and the additional cyclic code period $(k'+n-k)$, as readily understood from FIG. 10.

Figure 11:
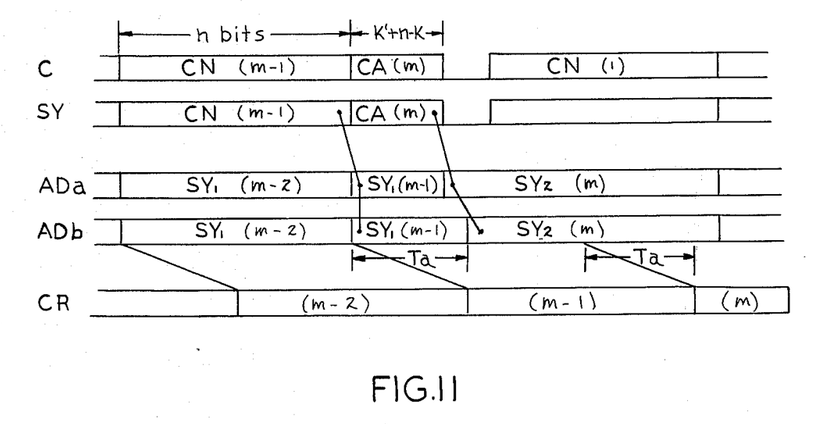
FIG. 11 is a time chart for describing operation of a converter according to a modification of the third embodiment.

Referring to FIGS. 8 and 11, a converter according to a modification of the third embodiment of this invention comprises a buffer 57 having a first and a second registers 57a and 57b, as shown by a dashed line. Signals and syndromes equivalent to those shown in FIG. 10 are designated by like reference symbols. The burst precedes the succeeding burst which has a first normal code block similar to each of the normal code blocks of the preceding burst.

The syndrome for the (m−1)-th code block of the preceding burst is simultaneously moved from the syndrome generator 56 to both of the first and the second registers 57a and 57b and is kept in the first and the second registers 57a and 57b, as shown by $AD_a$ and $AD_b$, respectively. The next following syndrome for the m-th block is moved to the first register 57a immediately after the next following syndrome is produced at the syndrome generator 56. On the other hand, the second register 57b keeps the syndrome for the (m−1)-th code block during the access time $T_a$ and, thereafter, keeps the next following syndrome. For this purpose, the holding signal HD is used together with the first and the second shift signals $SH_1$ and $SH_2$ and is not supplied to the syndrome generator 56. Thus, the next following syndrome for the m-th code block is moved from the syndrome generator 56 to the second part 57b before the access time $T_a$. It is possible to shorten the spacing between two adjacent bursts.

While a few embodiments of this invention have so far been described, it is now readily possible for those skilled in the art to put this invention into practice in various manners. For example, a plurality of the bit errors may be corrected by the use of the syndrome generator and the read-only memory. In addition, the processing circuit may be provided with more than two registers to make the spacing shorter.

What is claimed is:

1. A method of carrying out conversion for encoding/decoding for error detection/correction between a cyclic code sequence and a general code sequence, said cyclic code sequence lasting a duration determined by a burst, each of said cyclic and said general code sequences consisting of a plurality of normal code blocks and an additional code block arranged in a predetermined order, each of the normal code blocks of said cyclic code sequence consisting of a normal cyclic code of a first predetermined number of data bits followed by a second predetermined number of check bits, the additional block of said cyclic code sequence consisting of an additional cyclic code of a variable number of data bits followed by check bits, said variable number being less than said first predetermined number and dependent on said burst, the check bits of said additional cyclic code being equal in number to said second predetermined number, each of the normal code blocks of said general code sequence being for data bits followed by a prescribed period, the additional code block of said general code sequences being also for data bits followed by a like prescribed period, the data bits in the normal and the additional code blocks of said general code sequence being equal in number to said first predetermined and said variable numbers, respectively, said prescribed period being for arranging a plurality of check bits, equal in number to said second predetermined number, but being free of the last-mentioned check bits, said method comprising the steps of:

establishing code block periods of the normal code blocks of a predetermined one of said cyclic and said general code sequences and an additional code block period of the additional code block of said predetermined code sequence;

converting the normal code blocks of said predetermined code sequence to the normal code blocks of the other of said cyclic and said general code sequences, respectively, when said normal code block periods are measured; and converting the additional code block of said one code sequence to the additional code block of said other code sequence when said additional code block period is established, said additional code block converting step being carried out by assuming that the data bits in the additional code block of said predetermined code sequence is preceded by a dummy zero bit series of a data length equal to a difference between said first predetermined number and said variable number.

2. An encoder for carrying out the method of claim 1 by carrying out conversion from said general code sequence to the cyclic code sequence phase matched to said general code sequence, comprising:

producing means responsive to said general code sequence for producing a series of timing pulses which are timed relative to the normal and the additional code blocks of said general code sequence;

means responsive to said timing pulse series for establishing the normal and the additional code block periods of said general code sequence to produce a sequence of control pulses, each defining said prescribed period and thereby defining also a data bit period of any one of the normal and the additional code blocks of said general code sequence;

a single means responsive to said control pulse sequence and an input code sequence comprising a plurality of data bit sets of a first kind and a data bit set of a second kind, the data bits sets of said first-kind and of data bits sets of said second-kind corresponding to and synchronized with the data bits in the normal and the additional code blocks of either of said cyclic and said general code sequences, respectively, for producing a first set of check bits by the use of the data bits of each set of said first-kind during the prescribed period following the data bit period for the last-mentioned data bits and for producing a second set of check bits next following the data bits of said second-kind set by assuming that the set of data bits of said second-kind is preceded by said dummy zero bit series;

combining means responsive to said control pulse sequence and coupled to said single means for combining the first check bit sets and said second check bit set with the data bits of the normal and the additional code blocks of said general code sequence, said combining means thereby producing said cyclic code sequence; and means for supplying said single means with a preselected one of said general and said cyclic code sequences as said input code sequence.

3. An encoder as claimed in claim 2, wherein said producing means compromises:

preliminary means responsive to said general code sequence for detecting a last bit of the data bits in each of the normal and the additional code blocks of said general code sequence to product said timing pulses each of which is synchronized with said last bit of said each code block.

4. A decoder for decoding a cyclic code sequence into a general code sequence, said cyclic code sequence lasting for a duration which is determined by a signal burst and consisting of a plurality of normal code blocks and an additional code block immediately following a preselected one of said normal code blocks, each of said normal code blocks consisting of a normal cyclic code of a first predetermined number of data bits followed by a second predetermined number of check bits, said additional code block consisting of an additional cyclic code of a variable number of data bits followed by check bits, said variable number being less than said first predetermined number and being dependent on said burst, the check bits of said additional cyclic code being equal in number to said second predetermined number, said additional cyclic code being preceded by a dummy zero bit series of a data length equal to a difference between said first predetermined number and said variable number, said decoder comprising:

means responsive to said cyclic code sequence for producing a duration signal specifying said duration by detecting the beginning and the end of said duration;

timing means responsive to said duration signal for timing the normal and the additional code block periods of said cyclic code sequence to produce a sequence of first control pulses and a second control pulse, said first control pulses being timed relative to the respective normal code block periods of said cyclic code sequence, said second control pulse appearing at an instant a first predetermined duration behind the additional code block period of said cyclic code sequence;

processing means responsive to said cyclic code sequence, said first control pulse sequence, and said second control pulse for processing a preselected one of said normal cyclic code blocks during a first processing period and the additional code block of said cyclic code sequence during a second processing period to produce a first and a second processed signal, respectively, said first processing period being a period that follows a first control pulse timed relative to said prescribed normal cyclic code block, said second processing period being equal in duration to said first processing period and being started at said second control pulse, said second processing period consisting of a first partial period and a second partial period continuously following said first partial period, said first partial period being for processing said zero bit series, said second partial period being for processing the additional code block of said cyclic code sequence, said second partial period following the first processing period for said preceding normal code block, said first processed signal appearing in said first processing period, said second processed signal appearing in said second partial period, said additional cyclic code block thereby being processed by assuming that said additional cyclic code block is preceded by dummy zero bit series;

memorizing means for successively memorizing said cyclic code sequence to sequentially produce memorized normal and memorized additional code blocks;

means for combining said memorized normal and said memorized additional code blocks with said first and said second processed signals, respectively, for producing a combined cyclic code sequence; and means for converting said combined cyclic code sequence into said general code sequence.

5. A decoder as claimed in claim 4, said duration signal comprising a first pulse and a second pulse synchronized with the beginning and the end of said duration, respectively, each normal block of said cyclic code sequence having a first block bit pattern determined by a combination of the data bits and the check bits in said each normal block, the additional code block of said cyclic code sequence having a second block bit pattern determined by the data bits and the check bits in the additional block of said cyclic code sequence, wherein:

said timing means comprises:

means responsive to said first pulse for producing said first control pulse sequence and a sequence of third control pulses, each third control pulse being timed relative to the beginning of each of the normal and the additional code block periods in said cyclic code sequence;

means responsive to said second pulse for producing said second control pulse and a fourth control pulse synchronized with said second pulse;

said processing means comprising:

reference means responsive to a preselected one of said first and said third control pulse sequences for producing a sequence of reference pulses at an instant delayed by a preselected period relative to each third control pulse, said preselected period being equal to said first predetermined period;

means responsive to the reference pulses and said fourth control pulse for producing a holding signal which lasts between said fourth control pulse and the reference pulse that next follows said fourth control pulse;

phase comparing means for comparing said fourth control pulse with said reference pulses to produce a first level signal until said fourth control pulse appears a second level signal following said fourth control pulse and lasting until the next following reference pulse appears;

means for producing said third control pulses as a sequence of first shift pulses; and selecting means responsive to said fourth control pulse, said reference pulse, and said first and said second level signals for selecting said fourth control pulse when said second level signal appears and, otherwise, said reference pulse to produce a second shift pulse;

syndrome means responsive to said each code block, said holding signal, and said first and said second shift pulses for producing syndromes of a first kind and a second kind of a prescribed number of bits by the use of said holding signal and said first and said second shift signals, each of said first-kind syndromes being of a first syndrome bit pattern peculiar to said first block bit pattern, said second-kind syndrome being of a second syndrome bit pattern peculiar to a combination of said zero bit series and said additional bit pattern, said syndrome means thereby successively producing said first-kind syndromes for the respective normal cyclic code blocks and the second-kind syndrome for the additional cyclic code block;

storage means storing a correcting pattern corresponding to each syndrome for producing said error correcting pattern at the end of said first predetermined duration after each syndrome is supplied from said syndrome means, said error correcting pattern being for correcting each code block and consisting of pattern bits of a preselected number equal to the sum of said first and said second predetermined numbers, each of said pattern bits being placed with each of bit positions numbered in order;

retaining means for retaining said correcting pattern with said bit positions numbered in order;

first counter means energized by said first control pulse for producing, during said first processing period, a sequence of first addresses each of which is for specifying the respective bit positions of said error correcting pattern retained in said retaining means;

second counter means energized by said second control pulse for producing, during said second processing period, a sequence of second addresses each of which is for specifying the respective bit positions of said correcting pattern retained in said retaining means;

switching means responsive to said first and said second address sequences for selecting, as a sequence of selected addresses, said first clock pulses during said first processing period and said second clock pulses during said second partial period; and position adjusting means responsive to said selected pulse sequence and said retained error correcting pattern for successively adjusting each bit position of said error correcting pattern to each of said selected address to produce an adjusted correcting pattern as said first and said second processed signals.

* * * * *